W. T. HENSLEY & C. W. URBAN.
ELECTRIC STARTER.
APPLICATION FILED APR. 13, 1914.
1,285,167.
Patented Nov. 19, 1918.
3 SHEETS—SHEET 1.
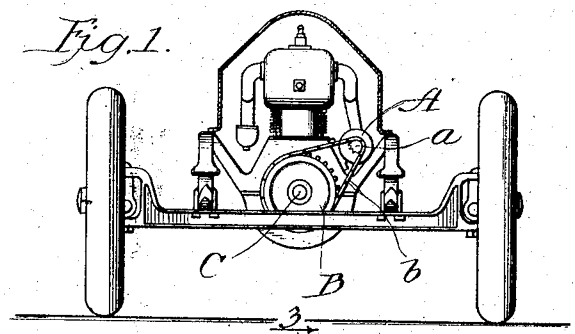
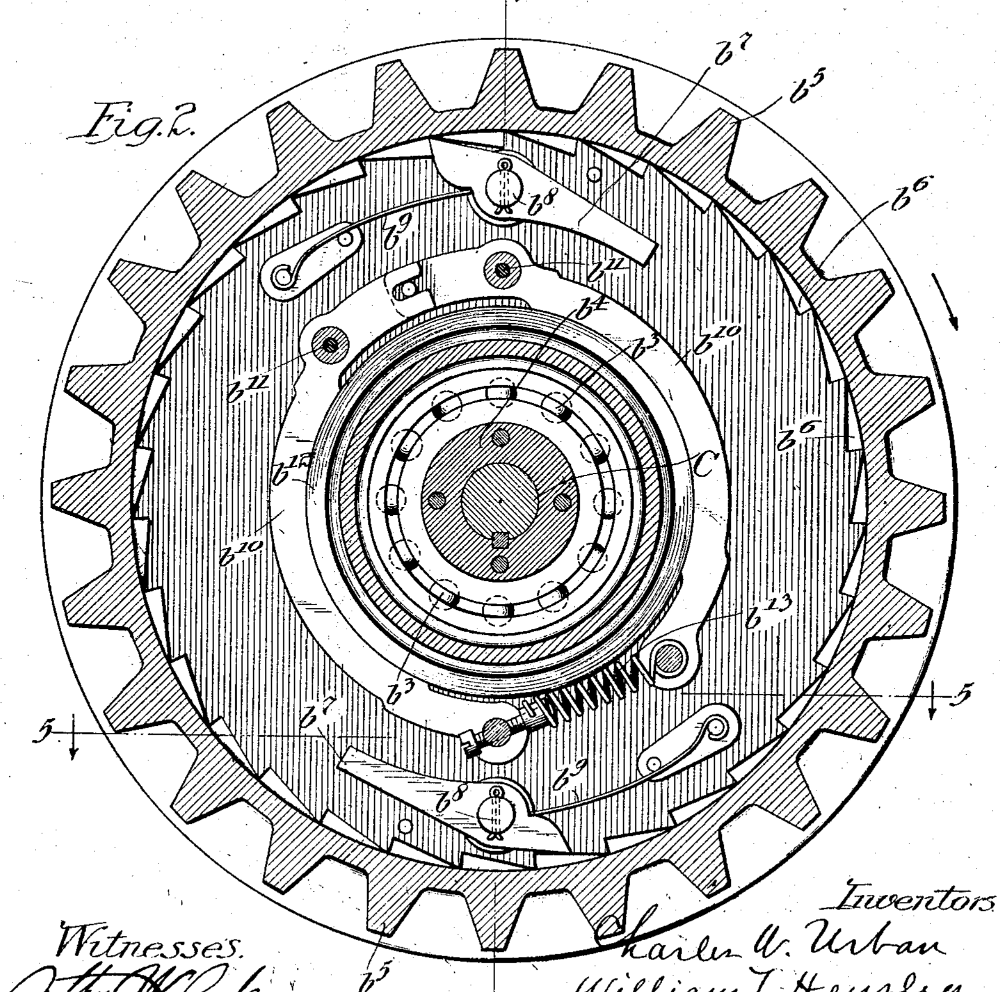
Witnesses.
Arthur W. Carlson
Stephen Rebora
Inventors
Charles W. Urban
William T. Hensley
By Arthur F. Durand
Attorney W. T. HENSLEY & C. W. URBAN.
ELECTRIC STARTER.
APPLICATION FILED APR. 13, 1914.
1,285,167. Patented Nov. 19, 1918.
3 SHEETS—SHEET 2.
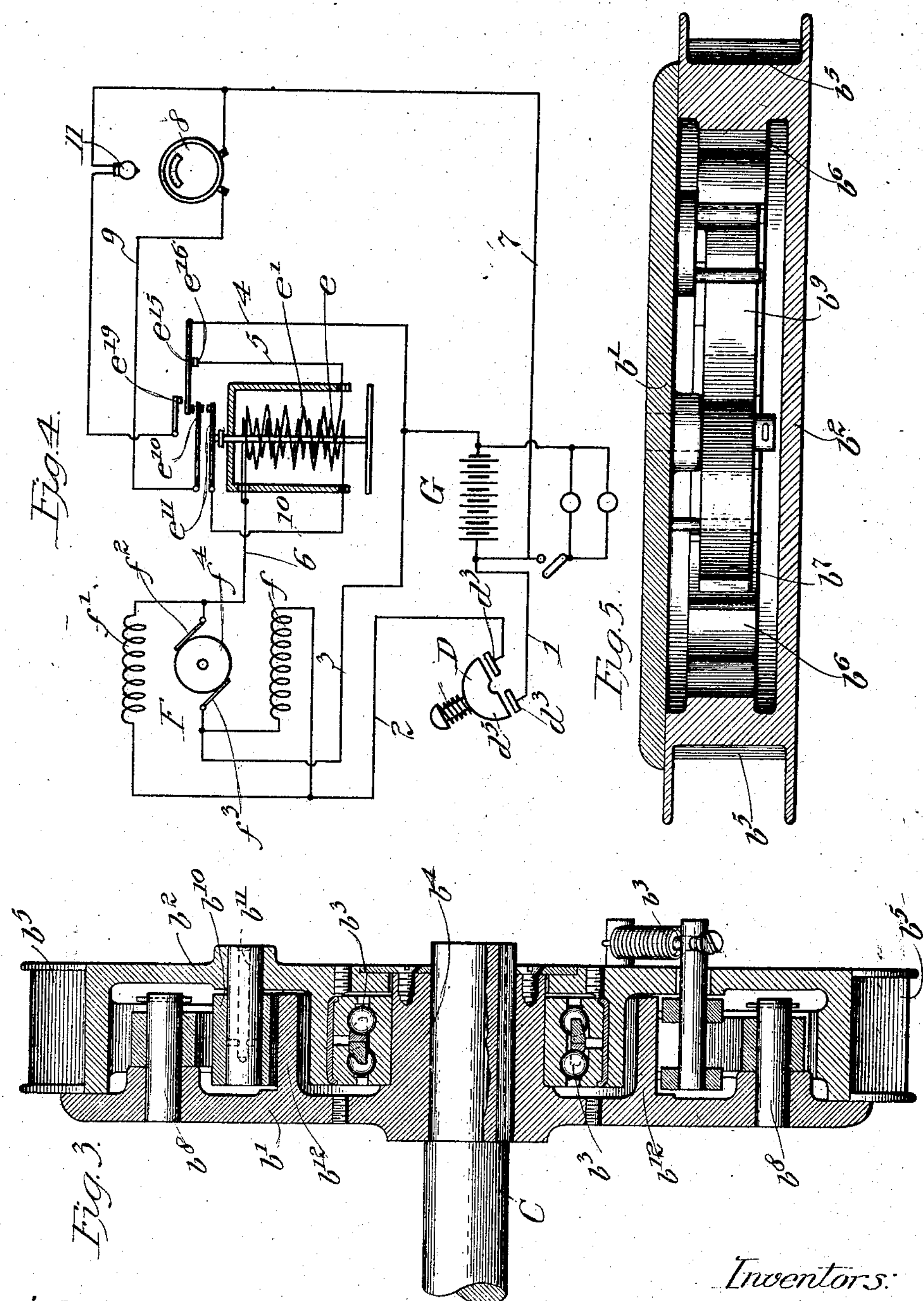
Witnesses:
Arthur W. Carlson
Stephen Rebora
Inventors:
Charles W. Urban
William T. Hensley
By Arthur F. Durand
Attorney.

W. T. HENSLEY & C. W. URBAN.
ELECTRIC STARTER.
APPLICATION FILED APR. 13, 1914.
1,285,167.
Patented Nov. 19, 1918.
3 SHEETS—SHEET 3.
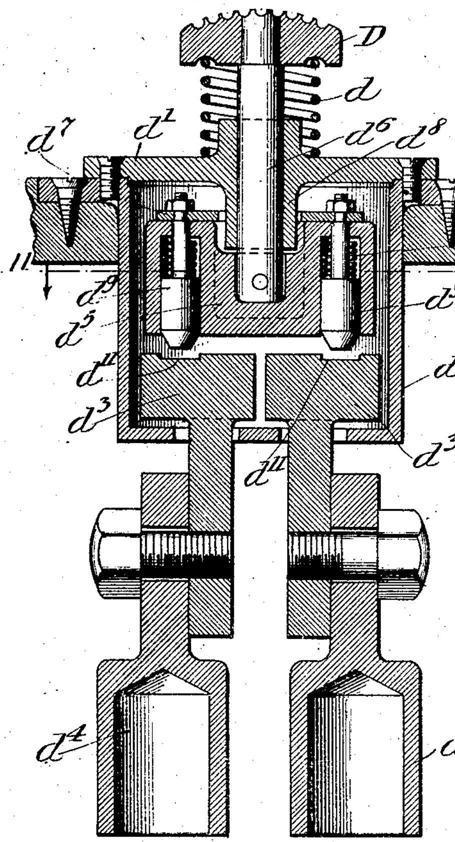
Fig. 7.
e16 e19 e10 e15 e12 e14 e11 e13 h e6 e2 E e5 e3 e e9 e8 e7 e4 H
Fig. 8.
e10 10 e14 h e16 e18 e12 e15 e20 e17 e19 10
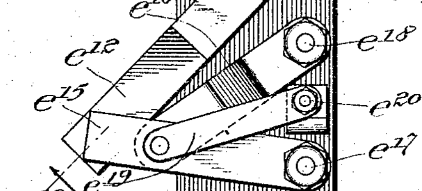
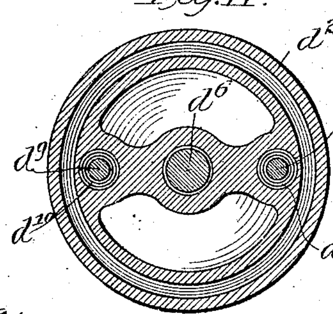
Fig. 10.
e10 e12 e14 e11 e13 h
Witnesses:
Arthur W. Carlson
Stephen Pelora
Inventors
Charles W. Urban
William T. Hensley
By Arthur F. Durand
Attorney

UNITED STATES PATENT OFFICE.

WILLIAM T. HENSLEY, OF BOUNDBROOK, AND CHARLES W. URBAN, OF WESTFIELD, NEW JERSEY, ASSIGNORS, BY MESNE ASSIGNMENTS, TO BOUND BROOK ENGINE & MFG. CO., A CORPORATION OF DELAWARE.

ELECTRIC STARTER.

1,285,167. Specification of Letters Patent. Patented Nov. 19, 1918.

Application filed April 13, 1914. Serial No. 831,638.

*To all whom it may concern:*

Be it known that we, WILLIAM T. HENSLEY and CHARLES W. URBAN, citizens of the United States of America, and residents of Boundbrook, Somerset county, and Westfield, Union county, New Jersey, respectively, have invented a certain new and useful Improvement in Electric Starters, of which the following is a specification.

Our invention relates to apparatus for starting internal combustion engines, and more especially to those employed on automobiles, motor boats, etc. There are many different forms of these devices and our invention relates more particularly to those which involve an electric motor for starting the engine.

Generally stated, the object of our invention is to provide a novel and highly efficient electric starter for use on automobiles, motor boats, etc., whereby the engine of the vehicle, boat or other structure, may be started without the necessity of manually rotating the shaft of the engine, ordinarily known as cranking, and whereby the engine may be started by simply pressing a lever or pedal or any other means for closing the starting circuit through the motor.

A special object is to provide a novel and highly efficient construction whereby a single dynamo electric machine may be employed for both purposes—that is to say, for first starting the engine, by rotating the crank shaft thereof, and for then charging the storage battery from which the current is supplied for starting purposes, thereby avoiding the necessity of employing two separate and distinct machines, a motor and a generator, for starting the engine and charging the battery.

It is also an object to provide certain features and combinations and details of construction tending to increase the general efficiency and serviceability of an electric starter of this particular character.

To these and other useful ends our invention consists in matters hereinafter set forth and claimed.

In the accompanying drawings—

Figure 1 is a front elevation of an automobile equipped with an electric starter embodying the principles of our invention.

Fig. 2 is an enlarged sectional view of the clutch which is mounted on the engine shaft, through which the single dynamo electric machine, operating as a motor, starts the engine, and through which the said dynamo electric machine, operating as a generator, after the engine has gotten under way, then charges the storage battery from which the current is supplied for starting purposes.

Fig. 3 is a section on line 3—3 in Fig. 2.

Fig. 4 is a diagram showing the starting and charging circuits of the apparatus involved in our improved electric starter.

Fig. 5 is a section on line 5—5 in Fig. 2.

Fig. 6 is an enlarged sectional view of the foot treadle and circuit controlling switch operated thereby for closing the starting circuit.

Fig. 7 is an enlarged sectional view of the relay by which the charging circuit, and certain auxiliary circuits, are automatically controlled.

Fig. 8 is a detail plan view of the spring contacts of said relay.

Fig. 9 is a side elevation of the parts shown in Fig. 8.

Fig. 10 is a detail section on line 10—10 in Fig. 8.

Fig. 11 is a detail section on line 11—11 in Fig. 6.

As thus illustrated, and referring to Fig. 1, the dynamo electric machine A is mounted in any convenient manner, at one side of the engine, and provided with a sprocket wheel $a$ of any suitable character. The sprocket wheel clutch B is mounted on the engine shaft C, and the two sprocket wheels are connected together by a sprocket chain $b$ of any well known or suitable form. The said clutch is preferably of the kind shown in Figs. 2, 3 and 5, comprising a disk $b^1$ which is keyed to the shaft C, and another disk $b^2$ which is loose on said shaft, being supported by the ball bearing $b^3$ carried by the hub portion $b^4$ of the said first mentioned disk. The disk $b^2$ is provided with sprocket teeth $b^5$, with a sprocket chain $b$, and is provided internally with ratchet teeth $b^6$, as shown more clearly in Fig. 2. The dogs $b^7$ are pivoted on the disks $b^1$, by means of fixed pins $b^8$, and are held yieldingly in engagement with said ratchet teeth by means of springs $b^9$, whereby when the clutch B is rotated in the direction indicated by the arrow in Fig. 2, in starting the engine, the shaft C will be rotated thereby. The brake shoes $b^{10}$ are pivoted at $b^{11}$ upon the disk $b^2$ and are arranged to engage the drum or cylindric flange $b^{12}$ which is integral or rigid with the disk $b^1$, said shoes being yieldingly held together and upon said drum by the spring $b^{13}$, or by any other suitable means. Thus, and when the speed of the engine becomes too great, after being started, the shoes $b^{10}$ are disengaged by centrifugal force from the drum $b^{12}$, or are caused to bear less firmly upon the said drum, whereby the engine can never drive the disk $b^2$ faster than a given speed, as will hereinafter more fully appear.

The foot treadle D is held normally in raised position by the spring $d$ which bears on the plate $d^1$ fastened to the body $d^2$ which is fastened to the floor of the automobile. This body contains a couple of fixed or stationary contacts $d^3$, of suitable metal, or of any other good conducting material. These contacts are provided with connectors $d^4$ whereby the switch is included in the starting circuit. The movable contact $d^5$ is secured to the lower end of the foot treadle stem $d^6$ and is adapted to move up and down within the body $d^2$, when the treadle is operated by the foot. The cross bar $d^7$ is movable up and down on the boss $d^8$ of the plate $d^1$, above the contact $d^5$, and is provided with the downwardly extending plungers $d^9$, which latter are disposed in vertical recesses in the said movable contact. The said plungers are held normally down by the springs $d^{10}$, which latter also serve to keep the bar $d^7$ normally in firm contact with the top of the movable contact $d^5$, as shown in Fig. 6. The lower ends of the plungers $d^9$ project below the face or contact surface of the movable contact $d^5$ and are adapted to engage the recesses $d^{11}$ formed in the tops of the stationary contacts. When the treadle is pressed downward, the plungers $d^9$ first engage the contacts $d^3$, whereby the circuit is closed preliminarily, so to speak, before the two stationary contacts are electrically connected together by direct contact with the lower surface of the movable contact $d^5$ in the required manner. It will be understood, of course, that the springs $d^{10}$ permit the contacts $d^5$ to move downward after the plungers $d^9$ have ceased their downward movement. Also, and when the foot treadle is released, the spring $d$ raises the contact $d^5$, whereby the circuit remains closed through the plungers $d^9$ for a period of time after the stationary contacts $d^3$ have been disengaged by the contact $d^5$, thereby preventing sparking or burning of main contacts.

The relay shown in Fig. 7, and which controls the charging and other circuits, is preferably constructed as follows: The core E forms a spool for the inner and outer windings $e$ and $e^1$, and has its head or upper end portion $e^2$ provided with a depending sleeve or shell $e^3$ of magnetic metal. The disk shaped armature $e^4$ is carried on the lower end of the stem $e^5$ which works up and down in the said core and which is provided with a head $e^6$ at its upper end. It will be seen that the lower end of the core E is provided with a seat $e^7$ for the tapered armature shoulder $e^8$ and that the lower edge of the shell $e^3$ is provided with a beveled seat $e^9$ for receiving the beveled edge of the said armature. With this construction, the stem $e^5$ moves up and down, when the relay is energized and deënergized. When the armature is attracted, the shell and core of the relay, together with the upper end portion $e^2$, serve as means for completing the magnetic circuit through the armature, whereby a powerful magnetic effect is produced. The upward movement of the head $e^6$ operates the two upper and lower springs $e^{10}$ and $e^{11}$, which are of some length, and which have their outside or non-opposing surfaces provided with insulations $e^{12}$ and $e^{13}$, these two springs being held in place by a binding post $e^{14}$, of any suitable or well known character. The relatively long spring $e^{15}$ is normally in electrical contact with the relatively short spring $e^{16}$, these springs being mounted upon the binding posts $e^{17}$ and $e^{18}$ respectively. The upper spring $e^{10}$ is normally out of contact with the spring $e^{15}$, and is supported by a suitable binding post $e^{20}$, as shown more clearly in Figs. 8, 9 and 10. When the head $e^6$ moves upward, the springs $e^{10}$ and $e^{11}$ are brought into electrical contact with each other, and the continued upward movement of the relay armature then causes the spring $e^{15}$ to disengage from the spring $e^{16}$ and engage with the spring $e^{10}$, it being observed that the said spring $e^{15}$ rests upon the insulation $e^{12}$ of the spring $e^{10}$, whereby this alternate opening and closing of circuits is effected.

Referring to Fig. 4, the operation is as follows: The dynamo electric machine F is a compound wound machine being of the type ordinarily known as a long shunt machine, as the shunt winding $f$ is in circuit with the series winding $f^1$, thus forming a long shunt including the two windings in series. When the foot treadle D is pressed, a circuit is completed from the storage battery G through the conductor 1, through the contacts $d^3$ and $d^5$ of said switch, through the conductor 2 to the series coil $f^1$, through the brushes $f^2$ and $f^3$ and armature $f^4$ of the dynamo electric machine, and over conductor 3 to the other pole of said battery. It will also be seen that the shunt winding $f$ is in circuit with the battery at this time, whereby both coils or windings of the machine are receiving current. This operates the said dynamo electric machine F as a motor, causing it to drive the clutch B through the sprocket connection. As soon as the engine begins to operate under its own power, and has attained a greater speed, the brake shoes $b^{10}$ of the clutch reduce the driving friction on the drum $b^{12}$, whereby the engine runs ahead of the dynamo electric machine, the speed of the latter remaining constant; and at this time it will be understood that the dogs $b^7$ are moving backward over the ratchet $b^6$, as the disk $b^1$ is rotating faster than the disk $b^2$, in a manner that will be readily understood. The dynamo electric machine thus driven by the engine becomes operative as a generator, the shunt coil or winding $f$ causing the machine to build up a sufficient voltage to enable the machine to deliver the required current; and at this time, of course, the series coil or winding $f^1$ is not in use, except as a part of the shunt circuit of the generator. The current thus generated flows first through a circuit including the conductors 3 and 4, the relay contacts $e^{16}$ and $e^{15}$, the conductor 5, the coil or winding $e^1$ of the relay, and the conductor 6 leading to the other pole of the generator. For convenience we have called this circuit the energizing circuit. Ordinarily, and while the engine is starting, this coil or winding $e^1$ does not sufficiently energize the relay, although it may receive current from the battery; but upon a slightly increased voltage, (in practice this increase may be about one-half of a volt for a six volt system) the said relay becomes sufficiently energized by the current from the generator F, causing the armature of the relay to rise and connect together the contacts $e^{10}$ and $e^{11}$, and at the same time shifting the contact $e^{15}$ from the contact $e^{16}$ to the contact $e^{19}$, as previously explained. This, it will be seen, closes a circuit from the generator through the conductor 3 to the battery G, then over the conductor 7 to the meter 8, through said meter and over the conductor 9 and through the contacts $e^{10}$ and $e^{11}$, through the conductor 10 to the coil or winding $e$, and thence over the conductor 6 to the other pole of the generator. This is a charging circuit; as it includes the said current meter 8, it follows that said meter will show every fluctuation in the current, caused by fluctuations in the driving transmission between the engine and the generator; but by reason of the manner in which the pressure of the brake shoes $b^{10}$ is relieved by centrifugal force, the generator will run at constant speed, or substantially so; and with the mechanism carefully adjusted, the said meter will show very little fluctuation, it being possible with this arrangement for the engine to run at either maximum or minimum speed without causing any material fluctuation of the current, although in practice there is a slightly larger charging current when the engine is running at low speed than when the engine is running at high speed, which is a desirable characteristic. During this charging operation it will be seen that the lamp 11 receives the current from the generator F over the conductors 3 and 4, through the spring carrying the contact $e^{15}$ and contact $e^{19}$; (contacts $e^{10}$ and $e^{15}$ being insulated from each other, the current will not thereby be short circuited) thence through the lamp 11, through meter 8 and over the conductor 9, through contacts $e^{10}$ and $e^{11}$, inner coil or winding $e$ of the relay, and thence through the conductor 6 to the other side of the generator. The meter 8 is thus always connected in the charging circuit so that as soon as the charging operation begins this meter will show, at all times, the amount of current being used for charging the battery. As soon as the engine and generator stop, the current from the generator will, of course, cease and the relay E will thereby be deënergized and the circuits and apparatus will then assume the positions shown in Fig. 4, where they are ready to be used again for starting the engine.

As previously stated, the battery may have a voltage of approximately six volts, in which case, and with the arrangement shown, the voltage while the battery is being charged would rise about 5-8/10 volts to 7-1/2 volts, in a manner that will be readily understood. The voltage of the dynamo electric machine, while running as a generator, may be either substantially the same as the maximum voltage of the battery, or a little more; and in any case, with the construction and arrangement shown, the further operation of the generator F after the battery is fully charged will do no harm. For example, the charging operation may continue after the battery is fully charged, and the battery may be of that well known character in which this will produce no injurious effect; or, and if the relative arrangement and adjustment are such that the battery when fully charged has a voltage substantially equal to that of the generator, the relay E will thereby be deënergized, as with the battery and generator voltage exactly the same there will be no current flowing in the coils or windings of said relay.

From the foregoing it will be seen, therefore, that my invention contemplates a novel and improved construction and arrangement whereby a single dynamo electric machine is sufficient for both purposes—that is to say, is capable of use as a motor for starting the engine, and of then operating as a generator to recharge the battery. For this purpose, as previously explained, the said dynamo electric machine F is preferably of the compound wound type of generator, having the coils or windings thereof connected and arranged in the manner shown and described. The said dynamo electric machine F is connected to the engine shaft by a simple transmission which serves for both purposes, thereby avoiding the necessity of one gear ratio or transmitting connection for starting the engine, and another gear ratio or transmission for charging the battery. By means of the clutch mechanism shown and described, the engine cannot operate the machine F at a variable speed, and consequently the charging current remains steady and uniform in character, as will be indicated by the meter included in the charging circuit; and if for any reason the clutch mechanism is not operating properly, whereby the variable speed of the engine results in a variable charging current, the said meter will at once indicate that the apparatus is not running in the desired manner, and will enable the user to remedy the difficulty at once. It is obvious, of course, that any suitable transmission can be used between the clutch B and the motor shaft, as belts or other power transmitting instrumentalities of any suitable, known or approved form can be employed for this purpose.

As to the arrangement of the different elements or instrumentalities which go to make up the complete engine starting apparatus, as herein shown and described, it is obvious that this may be of any suitable character. For example, the ammeter 8 can be mounted on the dash of the automobile, with the lamp 11 directly above; and the relay E can also be mounted on the dash, being provided with a housing H for this purpose. In this connection, also, it will be understood that the several switch springs of the relay are suitably arranged upon a block of insulation $h$, and that the latter is secured in any suitable manner above the relay magnet, and in such position that the head $e^6$ is directly below the outer end portion of the spring $e^{11}$, whereby the said springs are operated in the manner previously described. The electrical connections to and from the said relay springs can be of any suitable character, and any known or ordinary means can be used for this purpose. The manually controlled switch may be arranged in any suitable position, so that the treadle D can be easily operated by the foot. The electrical connections for this switch can also be made in any suitable manner.

With further respect to the clutch mechanism shown and described, it will be seen that the spring $b^{13}$, in combination with the adjusting screw which is shown applied to one end thereof, (see Fig. 2) constitutes a means whereby the frictional pressure of the clutch can be changed or varied to vary the speed of the dynamo electric machine. For example, and if the tension of this screw be increased, the friction of the clutch will be correspondingly increased, with the result that the charging current will be increased also; but if the tension of this spring is relaxed by loosening the screw adjusting device, then there will be a decrease of the charging current. In this way any desired charging current may be obtained at the will or pleasure of the user.

With further respect to the compound winding of the relay, it will be seen that the shunt winding $e^1$ thereof is depended on to cause the initial operation of the relay, whereby the armature is drawn up and the charging circuit closed. This is accomplished while the voltage is in excess of the battery voltage, of course, and when the charging circuit is closed the current then immediately flows in the series winding $e$, and the shunt circuit of the relay is opened. This operation is desirable for the reason that when the generator slows down to a point where the voltage is only slightly in excess of or equal to the battery voltage, a small current or no current at all then flows in the series winding, whereby the armature is released and the charging circuit is opened. When this is done the relay cannot then be fully energized again until the generator voltage is sufficiently in excess of the battery voltage. Otherwise, and if this relay armature should be held in attracted position after the generator voltage falls below that of the battery, the current from the battery would then immediately flow in a reverse direction in the relay magnet, through the series winding, and thereby retain the armature in attracted position. The result of this, of course, would be that the relay winding and also the meter would be in danger of being burned out or otherwise injured.

What we claim as our invention is:—

1. An electric starter for internal combustion engines, comprising a dynamo electric machine, a clutch whereby said machine and engine alternately drive each other, a storage battery, a starting circuit including said machine and battery, whereby said machine operates as a motor to start the engine, a charging circuit including said machine and battery, whereby the engine operates said machine as a generator to charge the battery, a manual switch for the starting circuit, and a relay for automatically closing the charging circuit when said machine is driven by the engine, operated by the generator current, said engine and machine having parallel shafts, said clutch being disposed on the engine shaft, and a connection from the clutch to the shaft of said machine.

2. An electric starter for internal combustion engines, comprising a dynamo electric machine, a clutch whereby said machine and engine alternately drive each other, a storage battery, a starting circuit including said machine and battery, whereby said machine operates as a motor to start the engine, an energizing circuit, a charging circuit including said machine and battery, whereby the engine operates said machine as a generator to charge the battery, means for opening said energizing circuit when said charging circuit is established, a manual switch for the starting circuit, and a relay for automatically closing the charging circuit when said machine is driven by the engine, operated by the generator current, said clutch having mechanism for preventing the engine from driving said machine faster than a given speed, and means for indicating whether said mechanism is keeping the machine running at proper speed.

3. An electric starter for internal combustion engines, comprising a dynamo electric machine, a clutch whereby said machine and engine alternately drive each other, a storage battery, a starting circuit including said machine and battery, whereby said machine operates as a motor to start the engine, an energizing circuit, a charging circuit including said machine and battery, whereby the engine operates said machine as a generator to charge the battery, means for opening said energizing circuit when said charging circuit is established, a manual switch for the starting circuit, and a relay for automatically closing the charging circuit when said machine is driven by the engine, operated by the generator current, said clutch including a ratchet for starting the engine, and a friction drive for operating said machine as a generator, having centrifugally operated means for reducing the friction as the speed of the engine increases, whereby to keep the machine running at uniform speed.

4. An electric starter for internal combustion engines, comprising a dynamo electric machine, a clutch whereby said machine and engine alternately drive each other, a storage battery, a starting circuit including said machine and battery, whereby said machine operates as a motor to start the engine, an energizing circuit, a charging circuit including said machine and battery, whereby the engine operates said machine as a generator to charge the battery, means for opening said energizing circuit when said charging circuit is established, a manual switch for the starting circuit, and a relay for automatically closing the charging circuit when said machine is driven by the engine, operated by the generator current, said clutch including a sprocket wheel loose on the engine shaft, ratchet teeth on said wheel, a disk fast on said shaft, a pawl pivoted on said disk to engage said teeth, whereby the engine is driven by said machine operating as a motor, a shoe pivoted on said wheel to frictionally engage the disk, a spring for resisting centrifugal force to keep the shoe against the disk, and a sprocket connection from said wheel to the shaft of said machine.

5. An electric starter for internal combustion engines, comprising a dynamo electric machine, a clutch whereby said machine and engine alternately drive each other, a storage battery, a starting circuit including said machine and battery, whereby said machine operates as a motor to start the engine, an energizing circuit, a charging circuit including said machine and battery, whereby the engine operates said machine as a generator to charge the battery, means for opening said energizing circuit when said charging circuit is established, a manual switch for the starting circuit, and a relay for automatically closing the charging circuit when said machine is driven by the engine, operated by the generator current, said relay including a winding, an armature, means for providing a closed magnetic circuit through said armature, when the relay is energized, a stem rigid with said armature, and spring contacts operated by said stem.

6. An electric starter for internal combustion engines, comprising a dynamo electric machine, a clutch whereby said machine and engine alternately drive each other, a storage battery, a starting circuit including said machine and battery, whereby said machine operates as a motor to start the engine, an energizing circuit, a charging circuit including said machine and battery, whereby the engine operated said machine as a generator to charge the battery, means for opening said energizing circuit when said charging circuit is established, a manual switch for the starting circuit, and a relay for automatically closing the charging circuit when said machine is driven by the engine, operated by the generator current, said switch including a pair of stationary contacts, a movable contact for electrically connecting said stationary contacts together, and a pair of spring pressed plungers whereby the circuit is closed before said movable contact engages said stationary contact, and whereby the circuit remains closed after said movable contact disengages said stationary contacts.

7. An electric starter for internal combustion engines, comprising a dynamo electric machine, a clutch whereby said machine and engine alternately drive each other, a storage battery, a starting circuit including said machine and battery, whereby said machine operates as a motor to start the engine, an energizing circuit, a charging circuit including said machine and battery, whereby the engine operates said machine as a generator to charge the battery, means for opening said energizing circuit when said charging circuit is established, a manual switch for the starting circuit, and a relay for automatically closing the charging circuit when said machine is driven by the engine, operated by the generator current, said clutch having a spring and means for adjusting the tension of said spring to control the speed of said machine.

Signed by us at Boundbrook, New Jersey, this 30th day of March, 1914.

WILLIAM T. HENSLEY.
CHAS. W. URBAN.

Witnesses:
M. W. KUNTZ,
J. A. MECHLER.

Copies of this patent may be obtained for five cents each, by addressing the "Commissioner of Patents, Washington, D. C."